June 29, 1937. B. F. KELLS Re. 20,428
BASKET
Original Filed Nov. 14, 1934 3 Sheets-Sheet 1
Fig. 1
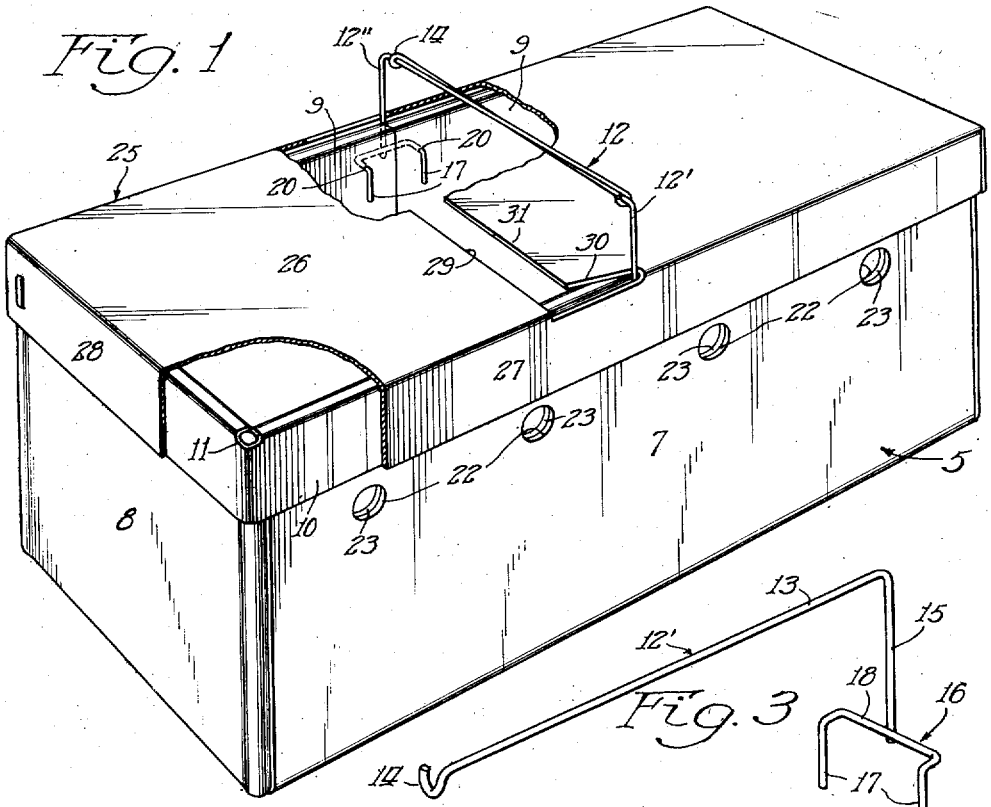
Fig. 3
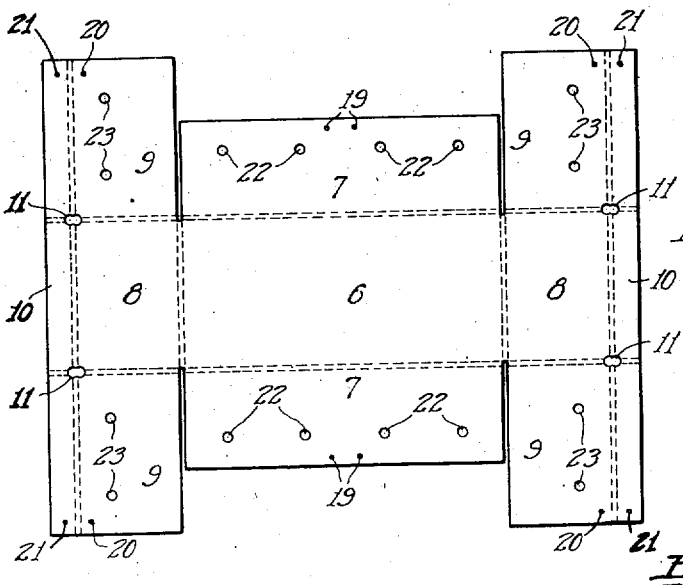
Fig. 2
Inventor
Benjamin F. Kells
By: E. A. Wagoneller
Atty.

June 29, 1937. B. F. KELLS Re. 20,428

BASKET

Original Filed Nov. 14, 1934 3 Sheets-Sheet 2

Inventor
Benjamin F. Kells
By: E. A. Wagoneller
Atty.

June 29, 1937. B. F. KELLS Re. 20,428
BASKET
Original Filed Nov. 14, 1934 3 Sheets-Sheet 3
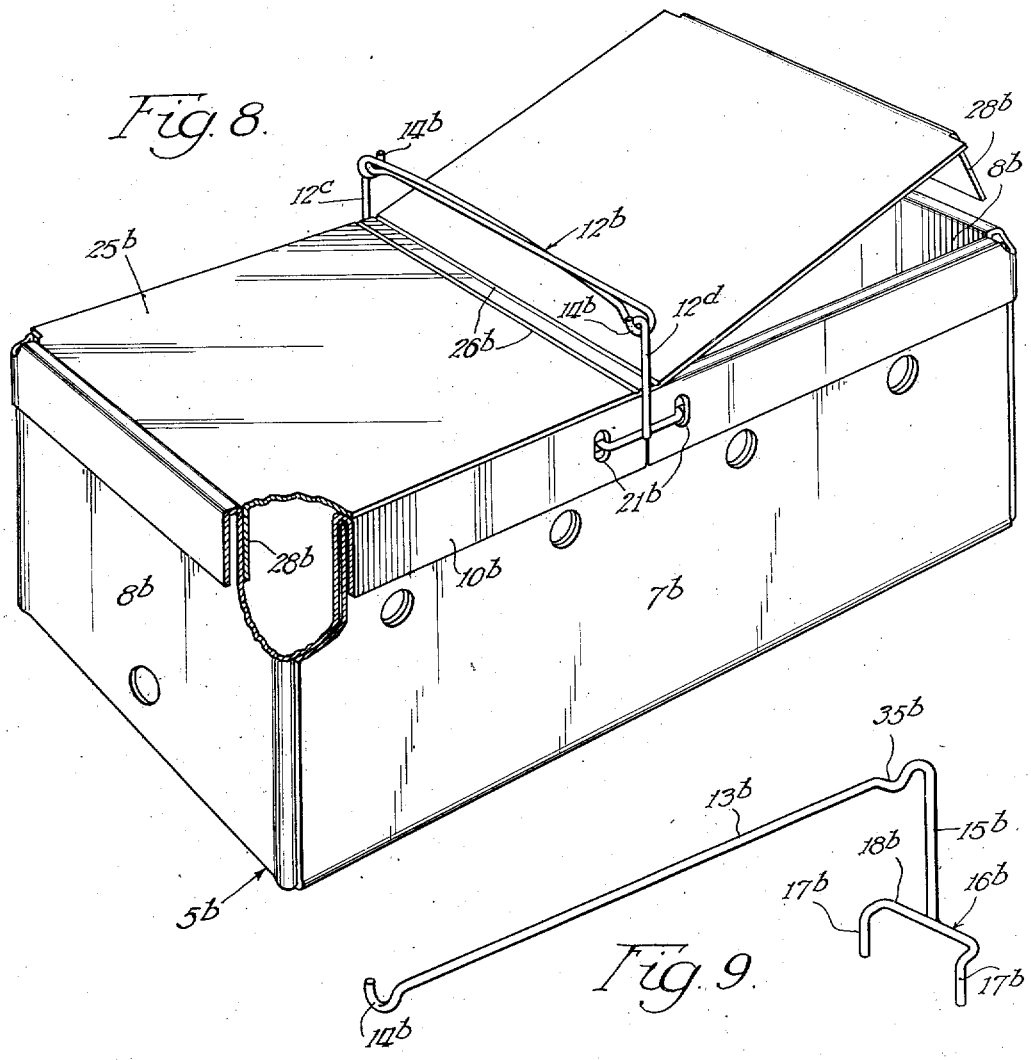
Inventor
Benjamin F. Kells
By: E. A. Wagoneller
Atty.

Reissued June 29, 1937 Re. 20,428

UNITED STATES PATENT OFFICE 20,428

BASKET

Benjamin F. Kells, Cincinnati, Ohio, assignor to Container Corporation of America, Chicago, Ill., a corporation of Delaware Original No. 1,999,461, dated April 30, 1935, Serial No. 753,032, November 14, 1934. Application for reissue April 12, 1937, Serial No. 136,506

20 Claims. (Cl. 229—52)

This invention relates to improvements in receptacles and more particularly to a box or basket adapted to be made from paper or fibreboard.

One object of the present invention is to provide a simple and economical paperboard box or basket which can be shipped in a collapsed condition to the user and can be readily set up by him without requiring the use of any special erecting or assembling equipment.

Another object of the invention is to provide a box or basket of strong and sturdy form, having a relatively smooth interior and exterior, particularly avoiding raw or rough edges along the tops of the side walls.

Other objects of the invention are to provide a reinforced top edge construction for the walls of the basket and to provide an arrangement by which the parts of the basket may be effectively secured together by means which also serves as a strong and durable handle for the basket.

A still further object of the invention is to provide an alternative construction of handle which may be united with the basket by simple stapling operation.

An additional object is to provide a cover for a basket of the type described which cover will not be likely to become readily displaced during handling of the basket.

Another object is to supply a special blank of fibreboard or the like which may be folded to form a box or basket body capable of standing in set-up condition without the use of auxiliary fastening means.

To these and other ends the invention resides in certain improvements and combinations of parts, all as will be hereinafter more fully described, the novel features being pointed out in the claims at the end of the specification.

In the drawings:

Fig. 1 is a perspective view, partly in section of a preferred embodiment of the invention.

Fig. 2 is a plan view of the blank.

Fig. 3 is a detail view illustrating a preferred form of handle.

Fig. 8 is a perspective view, partly in section of a modified form of the invention.

Fig. 9 is a detail view of another modified form of handle.

Similar reference numerals throughout the several views indicate the same parts.

Figure 4:
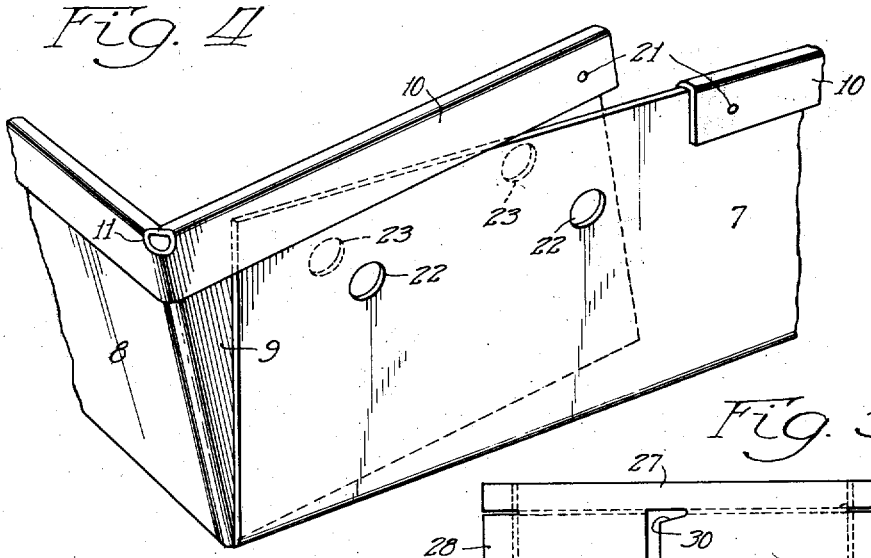
Fig. 4 is a fragmentary perspective view illustrating how the basket is to be folded in the process of assembly.

The present invention provides a simple and convenient basket construction having reinforced side walls and a rim portion at the upper edge thereof serving additionally to reinforce and stiffen the basket and includes the use of a handle adapted to serve both as a carrying means and a means for securing the basket in its assembled form.

Referring more particularly to the drawings, the basket, indicated as a whole at 5, in Fig. 1 may be formed of any cheap material, such as fibre or paper board, which is capable of being folded or bent without appreciable breaking.

A preferred form of the blank is illustrated in Fig. 2. This blank comprises a central panel 6 forming the bottom of the basket, side panels 7, 7, forming the side walls and end panels 8, 8 forming the end walls. End wall flaps are preferably of such a length as to substantially meet when folded inwardly against the side walls.

In order to strengthen and stiffen the upper edges of the side and end walls and also for the purpose of providing a smooth upper edge for the basket walls there is preferably provided at each end of the blank a strip 10. These strips, in the present instance, extend the entire length of the end wall panel 8 and the end wall flaps 9, 9. In order to facilitate bending of the strips 10 around the corner of the basket, die-cut openings 11, 11 are preferably cut in the blank where the corners of end wall 8 and end wall flap 9 meet the strip 10.

The end wall panels may be secured to the side walls in any desired manner but in the present instance it is preferred to employ a handle member so constructed and assembled with the side walls and end wall flaps as to maintain said walls and flaps in assembled condition. For this purpose the handle member 12 is employed, see Fig. 1 and 3.

The handle 12 may be constructed in one piece if desired but in the present instance is illustrated as comprising two sections, 12' and 12''. As each section is identical, a description of one will suffice. Each section comprises a shank 13 substantially parallel with the bottom of the basket. A hook portion 14 is provided at the free end of the shank 13, such hook portion lying substantially in the plane of the side walls. The inner end of the shank terminates in a downwardly extending portion 15 which is connected at its lower end with a bifurcated basket-engaging hook 16 having prongs 17, 17 bent downwardly and offset inwardly from a horizontal portion 18 connected to the vertically extending part 15.

Registering openings 19, 19 in the side walls; 20, 20 in the end wall flaps, and 21, 21 in the strip extensions thereon are preferably provided to receive the bifurcated ends of the handle.

Registering ventilating openings 22, 22 in the side walls, and 23, 23 in the end wall flaps are provided to afford adequate ventilation of the basket.

In the assembly of the basket the blank will be furnished flat and the first step will be to bend back the strips 10 along their attached end wall and end wall flaps. The end wall flaps are then bent to a position substantially at right-angles to the end walls and the side walls are bent upwardly to a position wherein they will lie in the plane of the end wall flaps. The end wall flaps will then be swung downwardly causing the end wall to assume a position at right-angles to the bottom and preferably causing the side walls to be engaged between the end wall flaps and the strips 10.

When the end wall flaps 9, 9 are resting with their lower edges adjacent the bottom of the basket the openings 19, 20 and 21 will be in substantial registration. The bifurcated ends of the handle members are then inserted through these registering openings preferably through the outside of the basket. When both sections of the handle are in place they may be firmly and practically permanently secured by first engaging one shank 13 in the hook 14 on the opposite shank then twisting such shank around the other as indicated in Fig. 1 and then fastening the hook on this shank around the opposite shank.

It will be obvious that, if desired, the bifurcated ends of the handle sections may be bent reversely to the manner shown so that they may be inserted from the inside of the basket instead of from the outside.

Figure 6:
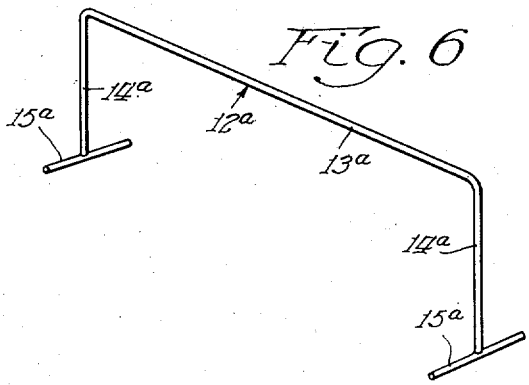
Fig. 6 is a detail view of a modified form of handle.
Figure 7:
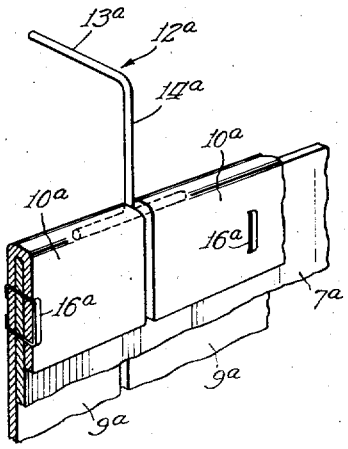
Fig. 7 is a detail view illustrating the method of assembly of the handle shown in Fig. 6 with the box.

In the modified form of basket illustrated in Figs. 6 and 7, the basket is made from a blank similar to that shown in Fig. 2, one side wall being indicated at 7a, the end wall flaps at 9a, 9a and the strip extensions at 10a, 10a.

The handle 12a on this form of the invention is preferably formed in a single piece having a shank 13a joined at each end with a downwardly extending portion 14a, terminating in laterally extending sections 15a.

The handle 12a is assembled with the basket by first folding the basket as described above, then inserting the handle so that the sections 15a, 15a engage beneath the fold between the strips 10a and the side walls 9a. Securing means such as staples 16a, 16a are then inserted so as to hold such strips firmly in position.

The basket cover of the present invention is preferably constructed so as to prevent accidental displacement and at the same time allow the cover to be somewhat raised when desired for inspection of the contents of the basket.

Figure 5:
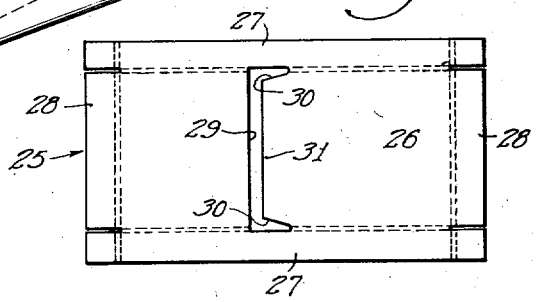
Fig. 5 is a plan view of the blank forming a cover for the basket.

Referring to Figs. 1 and 5, the cover 25 has a top panel 26 and depending flanges 27, 27 at the sides thereof and 28, 28 at its ends.

In order to provide ready assembly of the cover on the basket, the cover is preferably provided with a transversely extending slot 29 somewhat offset from the center line of the cover and having additional longitudinally extending slots 30, 30 extending substantially to or slightly past the central transverse line of the cover. The longitudinal slots 30, 30 form between them what may be termed a tongue 31.

In the use of the cover it is first placed so that the basket handle passes up through the transverse slot 29 until the flange 28 at one end of the cover rests upon the top edge of the basket. In this manner the tongue 31 is brought to a level below the horizontal shank 13 of the handle, after which the cover may be slid longitudinally of the basket so that the upright parts of the handle are received respectively within the slots 30, 30. When the handle is substantially in contact with the end of the slots 30, 30 the flange 28 will have dropped down over the end wall of the basket thus causing the cover to be firmly positioned thereon.

In removing the cover, it is necessary to both lift it and slide it longitudinally of the basket so that it is apparent that the cover cannot be displaced except by positive intention. If it is desired to inspect the contents of the basket the cover may be lifted from either end so that the end of such cover is slightly above the top of the basket.

In the modified form of the invention shown in Figs. 8 and 9 the basket 5b is formed from a blank identical in shape with the blank shown in Fig. 2 and comprises, as shown, end walls 8b, 8b and side walls 7b, 7b. The strip or rim 10b is folded downwardly as in the previously described forms and apertures 21b, 21b are provided in the strip 10b to receive the ends of the handle, as previously described. Other registering apertures, as previously described, are also provided in the side walls 7b, 7b.

The handle utilized in this form of the invention is designated as a whole at 12b and comprises two identical sections 12c and 12d, one of which is indicated in detail at Fig. 9. Each section of the handle comprises a shank 13b, a hook portion 14b at the free end thereof and a vertical portion 15b terminating in a bifurcated basket-engaging hook 16b having prongs 17b, 17b offset inwardly from a horizontal portion 18b connected with the vertical extending portion 15b, all similar to the handle previously described above.

The difference in the handle of the present modification resides in the formation of a retaining member 35b, which, in the present instance is in the shape of a downwardly bent portion or kink in the horizontal shank 13b of each handle section and near the point of juncture of the shank 13b and the vertical extending portion 15b. The purpose of the retaining member 13b is to retain the handle sections in assembled position as indicated in Fig. 8.

In the embodiment shown in Fig. 8, the cover 25b is in the form of a flat sheet scored at 26b to permit either end of the cover to be raised for inspection of the contents of the basket. The cover 25b is preferably provided with end flaps 28b which may be tucked in at the ends of the basket.

In the use of the embodiment just described, the basket will be set up and the hood portions of the handle inserted in the apertures therefor, in the same manner as previously described. However, instead of engaging the handle sections in assembled position as shown in Fig. 8, the sections are brought together so that the hooks 14b, 14b engage the complementary shank portions inside of the retaining members 35b.

It is apparent that the engagement of the handle sections in this manner will cause the side walls of the basket to be somewhat flared outwardly. After the contents of the basket have been packed therein the cover is placed on the basket and the flaps 28b, 28b are inserted. After the cover is in place, the handle sections are brought to final position as indicated at Fig. 8 by exerting inward pressure on each side of the basket. This inward pressure will cause the hooks 14b, 14b to slip past the retaining members 35b and the hooks will then be retained between these members and the vertical portion 15b of the handle sections. The cover 25b is preferably made of such a width as to be engaged by the vertical portion 15b of the handle sections, thus providing for a frictional retention of the cover member adjacent the mid-portion thereof.

From the foregoing it is apparent that the present invention provides a basket of paper or fibreboard which is admirably suited for the handling of small quantities of fruit and vegetables such as grapes and tomatoes and which can be shipped to the packer in a flat, compact form to be readily set up by him.

The side walls of the basket are particularly strong and sturdy as they are of double thickness and additionally reinforced by the outer strip extending around the top of the basket which, at the same time, is advantageous for use with relatively delicate fruit such as grapes and tomatoes due to the smooth and practically unbroken upper edge of the basket which is formed by the downwardly folded rim. The downturned rim at the top of the basket also insured proper ventilation of the baskets when piled in a car or storeroom, due to the fact that the rims contact each other and hold the body portions of the baskets out of close contact, thus permitting the free circulation of air both around the baskets as well as into the baskets through the ventilating openings provided in the side walls.

The form of the invention as illustrated in Figs. 1 and 8 is particularly well suited for a fruit packer who does not have any form of stapling or riveting equipment. Due to the particular form of handle shown in detail in Figs. 3 and 9 it is possible to set up the basket in a practically permanent form by the mere act of assembling the handle therewith. By proper proportioning of the bifurcated ends 17, 17 of the handle it is possible to cause these ends to be somewhat imbedded into the material of the end wall flaps 9, 9 forming the interior face of the basket to thus minimize any roughness which would otherwise exist due to the exposed ends 17, 17 on the inside of the basket.

Where the fruit packer desires to avoid any possible contact of the fruit with the metallic parts of the handle, the basket and handle illustrated in Figs. 6 and 7 may be employed, it being only necessary, in using this form of invention, to have a stapling or riveting machine for the purpose of securing the bent over strip against the outside of the basket.

Due to the particular form of cover employed, the contents of the basket may be effectively protected during storage and transportation and at the same time the basket contents may be inspected for condition by tilting the cover at one end or the other as has been described. The cover construction is such that it will not be likely to become readily displaced due to the fact that it requires a combination of vertical and longitudinal movements to remove it.

While the present description sets forth a preferred embodiment of the invention, numerous changes may be made in the construction without departing from the spirit of the invention, and it is therefore desired that the present embodiment be considered in all respects as illustrative and not restrictive, reference being had to the appended claims rather than to the foregoing description to indicate the scope of the invention.

I claim:

1. A fibreboard basket comprising a bottom and end walls, side walls integrally connected to the bottom, flaps on said end walls adapted to be folded so as to lie against the side walls when the basket is set up, a strip extending from the edge of the end wall flaps and adapted to be bent over the upper edge of the side wall adjacent said flaps, and securing means passing through said strips and adjacent side wall at each side of the basket for holding same in set-up condition.

2. A fibreboard basket comprising a bottom and end walls, side walls integrally connected to the bottom, flaps on said end walls adapted to be folded so as to lie against the side walls when the basket is set up, a strip extending from the edge of the end wall flaps and adapted to be bent over the upper edge of the side wall adjacent said flaps, said end wall flaps and strips thereon being of a length so as to substantially meet centrally of the basket, and a single securing means passing through said strips and adjacent side wall at each side of the basket for holding same in set-up condition.

3. A fibreboard basket comprising a bottom and end walls, side walls integrally connected to the bottom, flaps on said end walls adapted to be folded so as to lie against the side walls when the basket is set up, a strip extending from the edge of the end wall flaps and adapted to be bent over the upper edge of the side wall adjacent said flaps, said end wall flaps and strips thereon being of a length so as to substantially meet centrally of the basket, and a handle for the basket having means projecting through said strips and adjacent side wall at each side of the basket for securing the handle in place and at the same time holding the basket in set-up condition.

4. A fibreboard basket comprising a bottom and end walls, side walls integrally connected to the bottom, flaps on said end walls adapted to be folded so as to lie against the side wall when the basket is set up, a strip extending from the edge of the end wall and end wall flaps and adapted to be bent over to lie against the outside of the end wall and the side walls to provide a single rim extending around the corners of the basket, and means for securing the basket in set-up condition.

5. A fibreboard basket of relatively heavy fibreboard, comprising a bottom and end walls, side walls integrally connected to the bottom, flaps on said end walls and defined therefrom by score lines to adapt said flaps to be folded so as to lie against the side wall when the basket is set up, a strip extending from the edge of the end wall and end wall flaps and defined therefrom by score lines so as to adapt said strip to be bent over to lie against the outside of the end wall and the side walls to provide a single rim extending around the corners of the basket, means for securing the basket in set-up condition, and die-cut openings formed at the intersection of the score lines above mentioned adapted to facilitate bending of the strip against the outside of the basket.

6. A fibreboard basket comprising a bottom and end walls, side walls integrally connected to the bottom, flaps on said end walls adapted to be folded so as to lie against the side walls, when the basket is set up, a strip extending from the edge of each of the end wall flaps and adapted to be folded over the upper edges of the side walls adjacent said flaps, said flaps and the strips thereon being of a length so as to substantially meet centrally of the side walls, a handle for the basket, said handle including a pair of vertically extending portions, and horizontally extending portions at the lower ends of each vertically extending portion, said horizontally extending portions being disposed respectively beneath the folds formed between the end wall flaps and the extended strips thereon.

7. A handle section for a collapsible fibreboard basket, said section comprising an upstanding portion, a laterally extending shank joined thereto and terminating at its outer end in a hooked portion adapted to engage beneath a similar laterally extending shank on another handle section, said upstanding portion terminating at its lower end in a basket wall engaging hook.

8. A handle section for a collapsible fibreboard basket, said section comprising an upstanding portion, a laterally extending shank joined thereto and terminating at its outer end in a hooked portion adapted to engage beneath a similar laterally extending shank on another handle section, said upstanding portion terminating at its lower end in a bifurcated hook adapted to extend from the outside of the basket through the basket wall and contact the inner face of the basket.

9. A handle section for a collapsible fibreboard basket, said section comprising an upstanding portion, a laterally extending shank joined thereto, means associated with said laterally extending shank for connecting same to the shank of a similar handle section, said downwardly extending section terminating at its lower end in a basket wall engaging hook.

10. A fibreboard basket comprising a bottom, end walls and side walls cooperating therewith, a reinforcing member lying flat against each side wall to stiffen and strengthen same, said reinforcing members having a strip extension thereon adapted to fold over the upper edge of the adjacent side wall, and handle means for the basket including means for securing said extended strip to side wall.

11. A collapsible fibreboard basket of relatively heavy fibreboard material comprising bottom, side and end walls, flaps on the end walls adapted to lie against the inner faces of the side walls, and a downturned rim extension integral with the end walls and end wall flaps and lying on the outside of the basket to provide a smooth unbroken rim around the corners of the basket, a portion of the basket being cut away at the upper corners of the basket to facilitate bending of the rim extension.

12. A fibreboard basket formed of a single blank of sheet material, a bottom panel, side walls hingedly connected thereto, end walls on the ends of said bottom panel, end wall flaps extending laterally from the end walls, said end wall flaps being adapted to lie against the inside surface of the side walls, an extended strip on the outer edge of the end wall and end wall flaps, said strip being defined from the end wall by a score line and being adapted to be bent over to lie against the outer surface of the side walls, said side wall having handle-receiving apertures centrally thereof and the end wall flaps as well as the strips thereon having apertures that register respectively with one of the apertures in the side wall, and a handle member having bifurcated end portions at each end adapted to engage through said registering apertures whereby the end wall flaps and the strip extensions thereon are held in fixed relation to the side walls.

13. A fibreboard basket comprising a bottom, side and end walls, a handle for said basket, said handle having upstanding portions extending substantially from the top edges of said walls, a transverse portion of the handle connecting said upstanding portions, a cover adapted to close the upper side of said basket, said cover having a depending flange around its outer edges and being provided with a transversely extending slot adapted to allow passage of the handle therethrough, said slot being offset from the center of the cover, additional slots formed in the cover at each side thereof and communicating with said first-mentioned slot and extending to substantially the transverse center of the cover, whereby the cover after being placed on the basket through the first-mentioned transverse slot, may be slid lengthwise to allow the flanges of the cover to engage around the basket.

14. A cover adapted for use with a basket having a handle disposed centrally and transversely of its length, said cover having a depending flange around its outer edges and being provided with a transversely extending slot adapted to allow passage of a basket handle therethrough, said slot being offset from the center of the cover, additional slots formed in the cover at each side thereof and communicating with said first-mentioned slot and extending to substantially the transverse center of the cover, whereby the cover after being placed on the basket through the first-mentioned transverse slot, may be slid lengthwise to allow the flanges of the cover to engage around the basket.

15. A fibreboard basket comprising a bottom, end and side walls, a handle comprising two sections engaged respectively with the opposite side walls and each section including an upstanding portion, a horizontal portion connected thereto and a hook at the outward extremity of the horizontal portion, a retaining member formed on each horizontal portion adjacent but spaced from the upstanding portion, said retaining member on each handle section being adapted to retain the hook of the opposite handle section against displacement in a direction toward the mid-portion of the handle.

16. A fibreboard basket comprising a bottom, end and side walls, a handle comprising two sections engaged respectively with the opposite side walls and each section including an upstanding portion, a horizontal portion connected thereto and a hook at the outward extremity of the horizontal portion, a retaining member formed on each horizontal portion adjacent but spaced from the upstanding portion, said retaining member on each handle section being adapted to retain the hook on a side thereof remote from the upstanding portion of the opposite section while the basket is being filled, and being further adapted to permit the hook portions to pass thereby when pressure is exerted at opposite ends of the handle, whereby the hooks will snap into place and be retained between the upstanding portions of the handle and the retaining members.

17. A fibreboard receptacle comprising a bottom and end walls, side walls integrally connected to the bottom, a pair of flaps on each of said end walls adapted to be folded so as to lie against the side walls when the receptacle is set up, and strips extending from the upper edge portions of the flaps of each end wall and bent over the upper edges of the side walls adjacent said flaps.

18. A fibreboard receptacle comprising a bottom, end walls integrally connected therewith, side walls integrally connected to the bottom, a pair of flaps on each of said end walls adapted to be folded so as to lie against the side walls when the receptacle is set up, a strip extending from the upper edge portion of each end wall and its flaps and arranged exteriorly thereof, the upper edge portions of the side walls lying between the flaps and said strips.

19. A fibreboard receptacle comprising a bottom, end walls and side walls integrally connected to the bottom, a pair of elongated flaps integral with each end wall and folded so as to lie against and frictionally engaging the side walls, and a strip extending from the upper edge portion of each of the end walls and its flaps and bent over the upper edges of the side walls for holding the receptacle in set-up condition.

20. A fibreboard receptacle comprising a bottom, a first pair of oppositely disposed walls integrally connected with the bottom, a second pair of oppositely disposed walls integrally connected to the bottom and arranged at angles to the walls of the first pair, flaps on said second pair of walls folded so as to lie against the inner surfaces of the first pair of walls, and a strip extending from each wall of the second pair and from its flaps and bent over the upper edges of the walls of the first pair, said strips forming a rim extending substantially around the upper edge portion of the receptacle.

BENJAMIN F. KELLS.